United States Patent Office 3,217,806
Patented Nov. 16, 1965

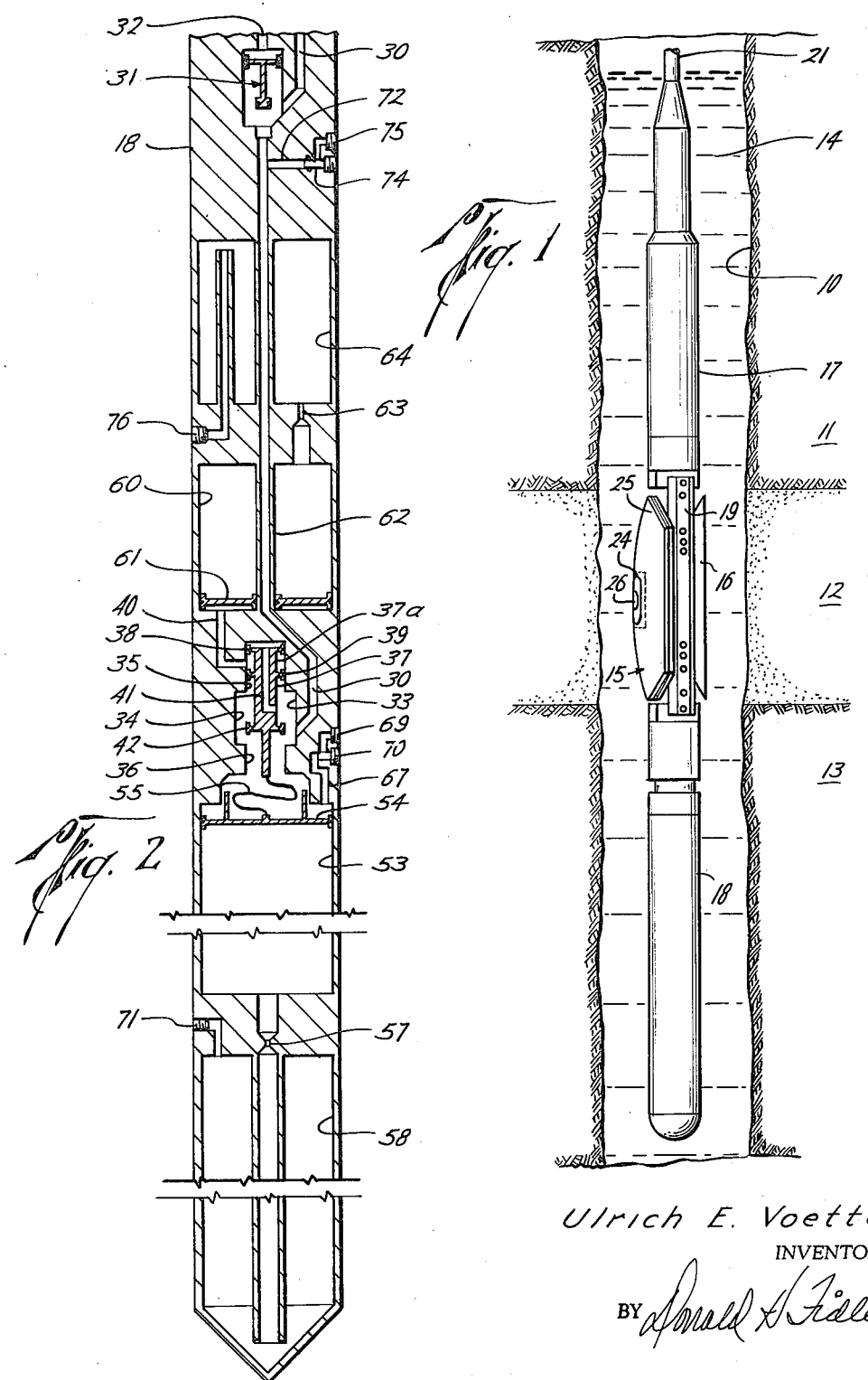

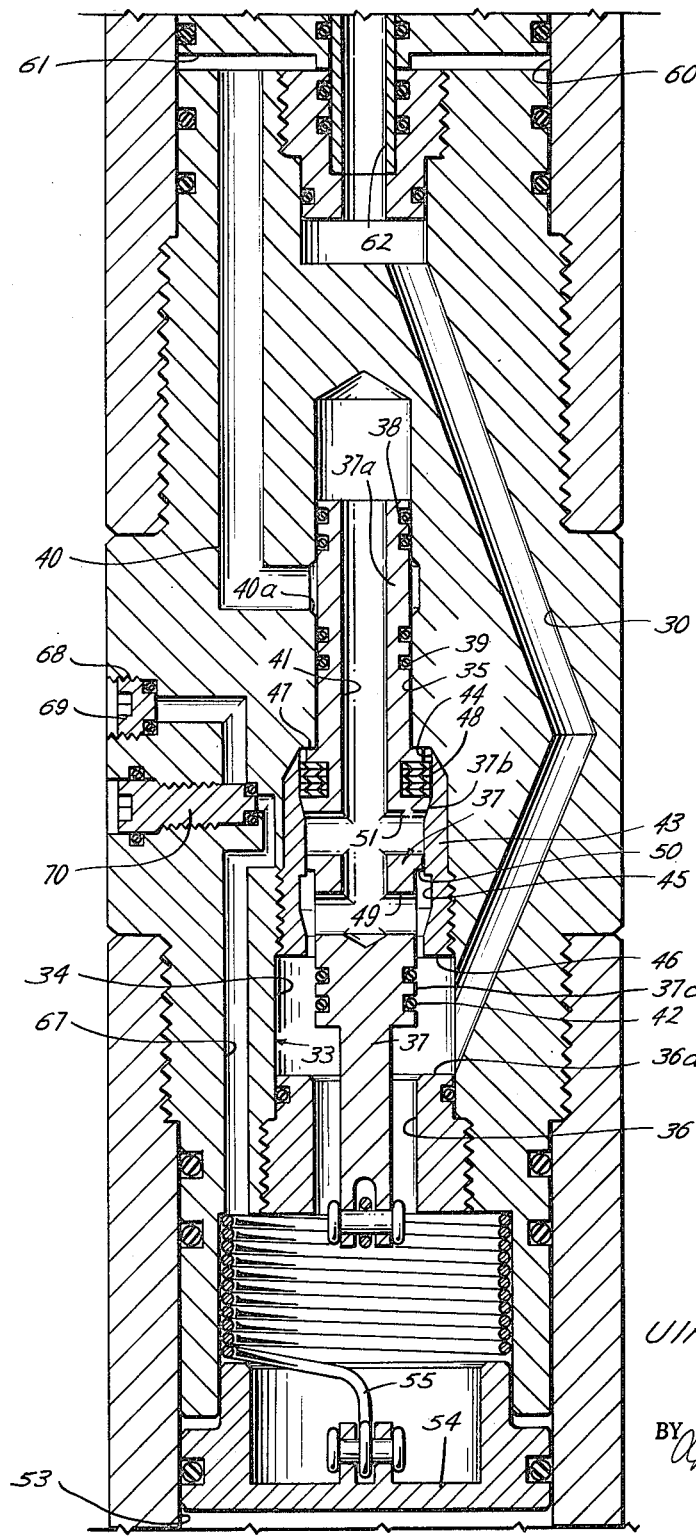
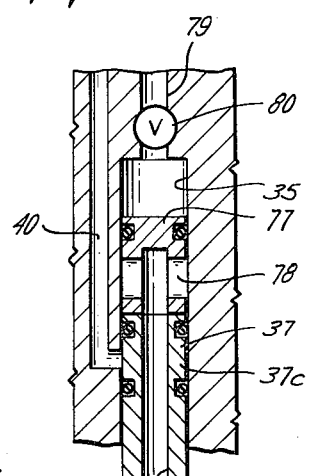
Fig. 3
Fig. 4
Ulrich E. Voetter
INVENTOR.

3,217,806
FLUID TESTING APPARATUS
Ulrich E. Voetter, Houston, Tex., assignor to Schlumberger Well Surveying Corporation, Houston, Tex., a corporation of Texas
Filed Apr. 30, 1962, Ser. No. 191,026
13 Claims. (Cl. 166—163)

This invention relates to fluid testing apparatus and more particularly to new and improved fluid testing apparatus for obtaining representative samples of fluid from a body under investigation. While the invention has a wide variety of application, it is ideally suited in association with earth formation fluid testing apparatus of the type disclosed in U.S. Patent No. 2,674,313 to L. S. Chambers or in U.S. Patent No. 3,011,544 to R. Desbrandes and R. Fields.

The fluid tester as disclosed in the above-identified patents, includes a support adapted to be lowered into a borehole drilled into the earth and positioned at a level of a formation of interest. This support carries pack-off and back-up shoes. Actuators are provided for driving the shoes into engagement with the side wall of the borehole or casing. Thus, that portion of the formation or casing under the pack-off shoe is sealed from the drilling liquid that usually fills the borehole and fluids from the formation may be induced to flow via an entry port in the pack-off shoe to a sample-retaining chamber within the support. After a desired amount of fluid is obtained, the sample-retaining chamber is closed, the shoes are retracted, and the apparatus is withdrawn from the borehole or casing so that the sample may be measured and and analyzed. Apparatus of the foregoing type has been used successfully in obtaining samples of earth formation fluids and has performed very satisfactorily in a large number of operations. However, under perfectly normal borehole conditions, fluids in the formation of interest very often are a mixture of common fluids and a fluid which invades the formation from the drilling mud. Thus, a recovered sample may not be entirely representative of the common fluids but would be more indicative of this mixture.

It is, therefore, an object of the present invention to provide new and improved fluid testers affording more information concerning common fluids in a body under investigation.

Another object of the present invention is to provide a new and improved fluid tester for obtaining a fluid sample in the form of discrete volumes each characterizing the body under investigation in a particular way.

Yet another object of the present invention is to provide a new and improved fluid tester for obtaining a fluid sample in which the sample is separated into two or more discrete volumes in their order of emission.

A fluid tester in accordance with the present invention comprises a body having a first fluid-receiving chamber including a cylinder and a piston; a second fluid-receiving chamber including a cylinder and a piston; and valve means responsive to a predetermined displacement of the first piston in the first cylinder for closing said first chamber and opening said second chamber to fluid flow whereby discrete fluid samples are obtained in separate sample-receiving chambers. Means are provided to lock the valve means in a closed position and means are provided for independently emptying the respective sample chambers.

The novel features of the present invention are set forth with particularly in the appended claims. The present invention, both as to its organization and manner of operation together with further objects and advantages thereof, may best be understood by way of illustration and example of certain embodiments when taken in conjunction with the accompanying drawings in which:

FIG. 1 is a perspective view of a side wall fluid sampler in which the present invention may be embodied shown in an operative position within a borehole drilled into the earth;

FIG. 2 is a schematic simplified representation of the present invention;

FIG. 3 is a cross sectional view illustrating in detail apparatus embodying the present invention; and FIG. 4 is a partial view in cross section illustrating another embodiment of the present invention.

In FIG. 1 of the drawing, apparatus embodying the present invention is shown disposed in the borehole 10 traversing earth formations 11, 12, 13 and containing a drilling fluid 14 such as a water base or oil base mud. It is assumed that formation 12 is the one of interest from which a fluid sample is to be obtained. The apparatus is positioned in the borehole 10 so that a central section including a normally retracted sealing pad or pack-off shoe 15 and an oppositely positioned normally retracted back-up shoe 16 are adjacent formation 12.

The apparatus further comprises upper and lower pressure resistant housing sections 17 and 18 connected together in longitudinally spaced relation by connecting members 19. Hydraulic actuators (not shown) are positioned between the connecting members 19 and are employed to drive the shoes 15 and 16 into engagement with the respective side wall portions of borehole 10. The apparatus thus far described is suspended in the borehole by an electrical cable 21 which in connection with a winch (not shown) located at the surfaces of the earth is employed to lower and raise the apparatus in the borehole in a customary manner. Conductors of cable 21 are employed for supplying electrical energy from a conventional power supply at the surface of the earth to various control circuits within the housing sections 17 and 18 and for conveying information from the tool to a surface recorder.

Generally stated, the upper housing section 17 contains a hydraulic driver (not shown) of the type for example, described in the above-mentioned patents, which employ the pressure of the borehole liquids to produce hydraulic pressure for driving the actuators that move the shoes 15 and 16. Housing 18 contains independent sample-receiving chambers which will be described hereafter in greater detail, the chambers being fluidly connected to a central portion 24 of pack-off or seal shoe 15.

Seal shoe 15 is comprised of the central portion 24 which may be in the form of a rigid insert and a resilient sealing face 25. The insert is provided with a normally closed front opening 26 which is coupled to the sample-receiving chambers. To open the front opening 26, a gun block (not shown) may be provided in which an explosive device is used. The explosive device further produces a perforation in the formations after the pad is in engagement with the borehole wall.

As shown in FIG. 2, housing section 18 at its upper end has a passageway 30 which is connected to the front opening 26 in the sealing pad 15. Passageway 30 may be closed by operation of a valve 31 when a hydraulic pressure is applied to the valve 31 via a passageway 32 in the housing 18. Passageway 30 extends through the housing 18 to a central section of housing 18 where it opens to a valve chamber 33. Valve chamber 33 consists of a central bore 34 and upper and lower bores 35 and 36 respectively having smaller but like diameters (see FIG. 3). A valve stem 37 is positioned in the valve chamber 33 to move between the upper position shown and a lower position.

As shown schematically in FIG. 2 and in detail in FIG.

3, valve stem 37 has an upper portion 37a, an intermediate locking and pressure balancing portion 37b and a lower valve portion 37c. In the upper position of valve stem 37, the valve portion 37a has spaced sealing elements 38, 39 disposed on the portion 37a to either side of an opening 40a of a bore 40 in the housing to prevent fluid flow through the bore 40. Also, in this upper position of the valve stem 37, the lower valve portion 37c is displaced from the lower bore 36 so that fluid may flow therethrough. In the lower position of valve element 37, sealing elements 38, 39 are displaced from bore opening 40a and valve element 37 has an internal passageway 41 therethrough so that central bore 34 is fluidly connected to bore 40. Also, in the lower position of the valve element 37, sealing elements 42 on the lower valve portion 37c close off the lower bore 36 from fluid flow.

As shown in detail in FIG. 3, central bore 34 receives a tubular insert 43 with an upper inner annular groove 44, an intermediate annular groove 45 and lower end surface 46. The intermediate locking and pressure balancing portion 37b of valve stem 37 is slidably received in the insert 43 and has an upper shoulder 47 to abut a shoulder in the housing formed between central bore 34 and upper bore 35. Metal snap rings 48 are mounted in the valve portion 37b just below the shoulder 47 and extend outwardly of the valve portion 37b a sufficient distance to engage the upper annular groove 44 and hold the valve stem 37 releasably in its upper position. When the valve stem 37 is pulled downwardly, the snap rings 48 collapse inwardly, and subsequent enlarge in the intermediate annular groove 45 or below the end surface 46 of the insert 43.

Passageway 41 in valve stem 37 has a lower opening 49 below a lower downwardly facing shoulder 50 in portion 37b to pressure balance the valve stem 37 in its upper position. Passageway 41 also has an upper opening 51 above the lower shoulder 50 for fluid communication if the lower opening 49 is positioned in lower bore 36.

The valve stem 37 as described has three positions, the upper position shown where the snap rings 48 hold it in position; an intermediate position where the snap rings 48 hold it in the intermediate groove 45 and a lower position where the snap rings 48 prevent upward movement by virtue of engagement with the end surface 46 of insert 43. In both the intermediate and lower positions of the valve stem, the sealing elements 42 on valve portion 37c are in sealing engagement with lower bore 36 preventing fluid flow therethrough. The reason for this is that sand or other accumulations may prevent the full closure of valve element 37 to its lower position so that the sealing elements are sealed in bore 36 in both positions. Hence, if valve element 37 does not travel its full stroke it still will be locked in a closed position if it reaches the intermediate locking positon.

Referring now to FIG. 2, below the valve chamber 33 is a first sample-receiving chamber including a cylinder 53 in which a piston 54 is initially positioned at the upper end of the cylinder. Piston 54 is coupled by a cable 55 to valve element 37. The volume of the cylinder 53 below the piston 54 (in the upper position of the piston) is filled with a cushioning fluid such as water and the cylinder 53 at its lower end is connected by a choke orifice 57 to a low pressure chamber 58 which, for example, may be at atmospheric pressure. Hence, a fluid flow in passageway 30 will pass through bore 36 and move piston 54 downwardly, the downward movement of piston 54 passing the water through the choke 57 into the air chamber 58. After the piston 54 has moved downwardly a sufficient distance, the cable 55 tightens so that further movement of piston 54 shifts the valve stem 37 from its upper position to its lower position thereby shifting the fluid communication between passageway 30 and bore 36 to connect passageway 30 to passageway 40.

Passageway 40 opens to a second sample-receiving chamber including a cylinder 60 and received therein an annular piston 61 normally positioned at the lower end of the cylinder and is slidable on a tube 62 forming the passageway 30. The volume of the cylinder 60 above the piston 61 is filled with a fluid such as water and cylinder 60 is connected via a choke 63 to an air chamber 64. Hence fluid flow in the passageway 30 will displace piston 61 which in turn displaces the water cushion through the choke 63 into the air chamber 64. After a suitable period of time has elapsed, seal valve 31 is operated to close off passageway 30 and at this time two separate and discrete fluid samples have been obtained in the unit.

Briefly, the operation of the apparatus thus far described is as follows: The apparatus is lowered to the formation of interest and the sealing pad placed in sealing engagement with the wall of the well bore. The explosive means in the apparatus are then operated to open the normally closed opening 26 and penetrate the formations. Fluid from the formations passes through passageway 30 into the valve chamber 33 of the housing section 18. Valve element 37 is locked in its upper position by snap rings 48 in groove 44 and fluid therefore passes through the lower bore 36 to move piston 54 downwardly at a rate controlled by the water cushion in cylinder 53 and choke orifice 57. When the actuating means such as cable, wire, chain cable or wire 55 attached to piston 54 is fully extended, further downward movement of piston 54 displaces valve element 37. Valve element 37 moves downwardly until sealing elements 42 are in bore 36 where flow to the sample chamber 53 is cut off. Expansion of the fluids trapped in the sample chamber 53 will create a differential pressure and therefore further downward movement of piston 54 and valve element 37 until the lower shoulder 50 of the valve element 37 abouts the housing portion 36a surrounding bore 36. At this time snap rings 48 are below end surface 46 of insert 43 so that the valve element 37 is locked in position.

If for any reason valve element 37 is not moved further after sealing elements 42 are in bore 36, the snap rings 48 will engage in the intermediate annular groove 45 to lock the valve element against opening of the bore 36.

When the sealing elements 42 of valve portion 37c are in bore 36, the upper valve portion 37a has uncovered opening 40a of passageway 40. Fluid flow in passageway 30 then is conducted via passageway 41 in valved element 37 to passageway 40. The openings 49, 51 in valve element 37 permit full flow irrespective of the positioning of valve element 37 in either the intermediate or lower position. Fuid flow in passageway 40 moves piston 61 at a rate controlled by the water cushion and the choke orifice 63 in the upper sample receiving chamber 60. At the end of the test (which can be monitored by pressure measurements) seal valve 31 is actuated by a fluid pressure in passageway 32 to close off the pasageway 30. Thereafter, the sealing pad 15 is retracted from the bore wall and the apparatus retrieved from the well bore.

At the surface it is necessary to analyze the fluid samples recovered. Each of the sample chambers is provided with means to release the sample from the respective chambers. As shown in FIG. 3, a passageway 67 is provided to open into the lower sample-receiving chamber 53 between the piston 54 and sealed bore 36. Passageway 67 has a threaded opening 68 to the exterior of the housing which is closed by a sealing plug 69. Intermediate of opening 68 and the sample-receiving chamber the passageway 67 is normally blocked or closed off by another sealing plug 70. To recover the entrapped sample, a christmas tree valve control unit (not shown) is substituted for the sealing plug 69 while plug 70 keeps the passageway 67 closed. Then, the sealing plug 70 can be operated to unblock passageway 67 and the sample can be recovered through the valve control unit. To assist recovery, the air chamber 58 (FIG. 2) is provided with a normally closed access opening 71 through which presure can be applied to move piston 54 upwardly and drive the fluid sample from the sample chamber.

The upper sample-receiving chamber 60 has a similar arrangement as shown in FIG. 2 where a passageway 72 has an exterior plugged opening 75 and flow blocking means 74 in the passageway 72. An access opening 76 for air cylinder 64 is also provided.

In FIG. 4, an embodiment of the present invention is disclosed where selectively operable hydraulic actuating means move the valve element 37 between spaced positions. In this embodiment cable 55 as shown in FIG. 3 is eliminated. To move the valve element 37 from its upper position to its lower position, a piston element 77 is disposed in bore 35 above the valve element 37. Piston element 77 has a lower tubular portion which abuts valve element 37 and is provided with longitudinally extending slots 78. Bore 35, at its upper end, is provided with a pasageway 79 connected to hydraulic power means (not shown) and a normally closed valve 80 in the passageway. Upon the selective opening of valve 80, pressure is applied to piston element 77 to shift valve element 37 to its lower position and fluid may flow through passageway 41 and slots 78 into passageway 40.

While a particular embodiment of the present invention has been shown and described, it is apparent that changes and modifications may be made without departing from this invention in its broader aspects. Therefore, the aim in the appended claims is to cover all such changes and modifications as fall within the true spirit and scope of this invention.

What is claimed is:

1. A fluid sampling apparatus including: a first sample-receiving chamber including a cylinder and a piston movable therein upon receipt of a fluid sample; a second sample-receiving chamber including a cylinder and a piston movable therein upon receipt of a fluid sample; valve means for selectively connecting a fluid sample to said sample-receiving chambers including a valve element in a valve chamber longitudinally movable between first and second positions, said valve chamber and valve element having cooperating bores and sealing elements where one of said sample-receiving chambers is open to fluid flow and the other of said sample-receiving chambers is sealed off from fluid flow in said first position of said valve element, and in said second position of said valve element, said other sample-receiving chamber is open to fluid flow and said one sample-receiving chamber is sealed off from fluid flow; means responsive to a predetermined displacement of one of said pistons for moving said valve element from said first position to said second position; and means defining a sample admitting opening for a fluid sample to said valve chamber.

2. The apparatus of claim 1 and further including locking means on said valve element and valve chamber permitting movement of said valve element relative to said valve chamber from said first position to said second position but preventing relative movement from said second position to said first position.

3. The apparatus of claim 1 and further including locking means on said valve element and valve chamber permitting movement of said valve element relative to said valve chamber from said first position to said second position but preventing relative movement from said second position to said first position and wherein said moving means is a cable attached between said valve element and said one piston.

4. A fluid sampling apparatus including: a first sample-receiving chamber including a cylinder and a piston movable therein upon recepit of a fluid sample; a second sample-receiving chamber including a cylinder and a piston movable therein upon receipt of a fluid sample; valve means for selectively connecting a fluid sample to said sample-receiving chambers including a valve chamber having a central bore and upper and lower bores of lesser diameter than said central bore, a valve element slidably received in said valve chamber and having an upper section received in said upper bore, an intermediate section received in said central bore, and a lower section arranged to be sealingly received in said lower bore upon downward movement of said valve element, said valve element having a passageway therein extending between said intermediate section and said upper section, said central bore having spaced locking recesses therein, one-way locking elements on said intermediate portion of said valve element cooperable with said locking recesses to prevent movement of said valve element in one direction, said locking recesses being spaced from said lower bore to hold said valve element in an upper position where said lower bore is open and to hold said valve element in a lower position where said lower valve section is sealingly received in said lower bore; one of said cylinders opening to said lower bore and the other of said cylinders opening to said upper bore; means sealing off said passageway in said valve element from said other cylinder; a cable extending through said lower bore attached to said valve element and said piston in said lower cylinder and responsive to a predetermined displacement of said last mentioned piston to move said valve element to its lower position; and means defining a sample admitting opening for a fluid sample to said valve chamber.

5. A fluid sampling apparatus including: a first sample-receiving chamber including a cylinder and piston movable upon receipt of a fluid sample therein; a second sample-receiving chamber including a cylinder and piston movable upon receipt of a fluid sample therein; valve means for selectively admitting a fluid sample to said sample-receiving chambers including a valve element received in a valve chamber and movable between first and second positions, said valve element cooperating with said valve chamber in said first position to close off one of said chambers while permitting fluid sample admittance to the other of said chambers, said valve element cooperating with said valve chamber in said second position to close off said other chamber while permitting fluid sample admittance to said one chamber; means for moving said valve element from said first position to said second position; and means for admitting a fluid sample to said valve chamber.

6. The apparatus of claim 5 wherein said moving means includes a cooperative coupling element between the piston in said other chamber and said valve element which is responsive to a predetermined displacement of the piston under the influence of a fluid sample.

7. The apparatus of claim 6 wherein said moving means includes selectively operable hydraulic actuating means for moving said valve element between said positions.

8. The apparatus of claim 6 and further including means for controlling the rate of piston movement in a cylinder upon receipt of a fluid sample to one side of a piston including a cushioning fluid disposed on the opposite side of said piston, a low pressure chamber and an interconnecting chamber orifice for restricting the passage of said cushioning fluid to said dump chamber, for at least one of said sample-receiving chambers.

9. The aparatus of claim 6 and further including a sample-discharge passageway connected between the exterior of the apparatus and a sample-receiving chamber; means selectively closing said passageway, and means providing releasable block for fluid flow through said passageway so said selective closing means may be opened and equipment attached thereto prior to the releasing of the fluid block means in said passageway.

10. A fluid sampling apparatus for use in a well bore including a housing adapted to be suspended in a well bore, said housing having first and second sample-receiving chambers, means in said housing for passing a fluid sample to each of said sample-receiving chambers, first valve means for normally closing one of said chambers while leaving said other chamber open, said first valve means being operable to open said one chamber and close said other chamber, means for operating said first valve means, and second valve means for closing off said passing means.

11. A fluid sampling apparatus for use in a well bore including a housing adapted to be suspended in a well bore, said housing having first and second sample-receiving chambers, means in said housing for passing a fluid sample to said sample-receiving chambers, valve means normally closing one of said chambers and normally opening the other of said chambers and operable to close said other chamber and open said one chamber, and means for operating said valve means.

12. A fluid-sampling apparatus for use in a well bore comprising: a first sample-receiving chamber including a piston therein movable upon receipt of a fluid sample into said first chamber; a second sample-receiving chamber; means for passing a fluid sample to each of said chambers; valve means for normally closing said second chamber and normally opening said first chamber in a first position of said valve means, said valve means being movable to a second position to close said first chamber and open said second chamber; and means responsive to movement of said piston member for moving said valve means to said second position.

13. A fluid-sampling apparatus for use in a well bore comprising: a first sample-receiving chamber including a piston therein movable upon recepit of a fluid sample into said first chamber; a second sample-receiving chamber; means for passing a fluid sample to each of said sample-receiving chambers; first valve means for normally closing said second chamber while leaving said first chamber open, said first valve means being operable to open said second chamber and close said first chamber; means responsive to movement of said piston member for operating said first valve means; and second valve means for closing off said passing means.

References Cited by the Examiner
UNITED STATES PATENTS

| | | | |
|---|---|---|---|
| 2,640,542 | 6/1953 | Brown et al. | 166—165 X |
| 2,674,313 | 4/1954 | Chambers | 166—100 X |
| 2,858,764 | 11/1958 | Hesson et al. | 137—119 X |
| 2,921,629 | 1/1960 | Stout | 137—119 |
| 2,951,536 | 9/1960 | Garrett | 166—224 X |
| 2,951,537 | 9/1960 | Desbrandes | 166—100 X |
| 3,011,554 | 12/1961 | Desbrandes et al. | 166—100 |
| 3,079,793 | 3/1963 | Le Bus et al. | 166—100 X |

CHARLES E. O'CONNELL, *Primary Examiner*.